(12) United States Patent
Blichmann

(10) Patent No.: US 10,767,147 B1
(45) Date of Patent: Sep. 8, 2020

(54) WIRELESS MODULAR BREWING SENSOR AND BREW MONITORING SYSTEM

(71) Applicant: John Blichmann, Lafayette, IN (US)

(72) Inventor: John Blichmann, Lafayette, IN (US)

(*) Notice: Subject to any disclaimer, the term of this patent is extended or adjusted under 35 U.S.C. 154(b) by 542 days.

(21) Appl. No.: 15/395,766

(22) Filed: Dec. 30, 2016

Related U.S. Application Data

(60) Provisional application No. 62/272,734, filed on Dec. 30, 2015.

(51) Int. Cl.
*C12C 13/10* (2006.01)
*C12C 7/06* (2006.01)
*G05B 19/048* (2006.01)

(52) U.S. Cl.
CPC .......... *C12C 13/10* (2013.01); *C12C 7/06* (2013.01); *G05B 19/048* (2013.01); *G05B 2219/24015* (2013.01)

(58) Field of Classification Search
CPC ......... C12C 13/10; C12C 7/06; G05B 19/048; G05B 2219/24015
USPC .......... 99/275, 278, 281, 288, 343; 374/204, 374/207, 208, 100, 141, 148, 195, 198
See application file for complete search history.

(56) References Cited

U.S. PATENT DOCUMENTS

| 4,595,301 | A | * | 6/1986 | Taylor | G01K 5/70 374/207 |
|---|---|---|---|---|---|
| 5,632,557 | A | | 5/1997 | Simons | |
| 7,785,003 | B2 | | 8/2010 | Blichmann | |
| 9,109,192 | B1 | | 8/2015 | Mitchell et al. | |
| 2005/0074380 | A1 | * | 4/2005 | Boren | B01J 19/006 423/1 |
| 2007/0053408 | A1 | * | 3/2007 | Blichmann | G01K 1/14 374/208 |
| 2014/0017354 | A1 | | 1/2014 | Joseph et al. | |
| 2016/0066744 | A1 | * | 3/2016 | Baxi | A47J 36/32 99/343 |
| 2016/0194587 | A1 | * | 7/2016 | Ellegood | C12C 11/006 426/16 |

* cited by examiner

*Primary Examiner* — Phuong T Nguyen
(74) *Attorney, Agent, or Firm* — Tyler B. Droste; Gutwein Law

(57) ABSTRACT

A modular wireless brewing sensor comprising a processor housing. The processor housing has a power source, a processing means, an antenna and a RF transmitter. A separable probe housing can be coupled to the processor housing. The probe housing can comprise a probe, a fitting, a seal element, and a fitting fastener. A modular wireless brewing sensor can be communicatively connected to a control system that can provide a user real-time feedback on the environmental conditions within a brewing vessel. A brewing system can be used to control other brewing apparatuses, such as a burner or pump upon the environmental conditions exceeding pre-determined thresholds set in the control system by a user.

10 Claims, 10 Drawing Sheets

WIRELESS MODULAR BREWING SENSOR AND BREW MONITORING SYSTEM

CROSS-REFERENCE TO RELATED APPLICATION

This U.S. patent application claims priority to U.S. Provisional Application 62/272,734 filed Dec. 30, 2015, the disclosure of which is considered part of the disclosure of this application and is hereby incorporated by reference in its entirety.

FIELD OF THE INVENTION

This invention relates generally to sensors, and in particular to wireless sensors and components thereof that may be used to determine the temperature, pH, specific gravity, and other measurements of liquids during the process of brewing beer. More specifically, this invention relates to using a single sensor body with modular sensor attachment that can be in wireless communication with a control system for use during the process of brewing beer.

BACKGROUND

In the small scale and home brewing industry, it is well known in the art to utilize various types of instruments throughout the brewing process to monitor temperature, specific gravity, and pH. These instruments can include thermometers, thermostats, hydrometers, and pH meters for monitoring the various aspects and controlling the variables in the beer brewing process. During the mashing process of beer making, or more appropriately stated, wort making (unfermented beer), precise control of temperature is vital to provide the desired flavor and level of sweetness and body desired for the finished beer. For example, if certain temperatures are exceeded, specific desirable enzymes may be permanently destroyed thereby changing the desired sugar content of the wort. If certain temperatures are not reached, the level of sweetness may not be developed.

Additionally, several temperature rest periods are commonly utilized in the mashing process to break down proteins, create fermentable and unfermentable sugars, and separate sugars from grains. A dough-in step is used to mix the crushed grains and the water, typically done between about 97° F. and about 113° F. A protein rest of between approximately 113° F. and approximately 132° F. is used to break down proteins. One or more saccharification rests, ranging between about 140° F. and about 162° F., allows enzymes to convert the starch of the grains into fermentable sugars. A "mash-out" is employed to stop the enzyme activity, "lock-in" the sugar profile, and reduce viscosity of the mash. A sparging (rinsing) process is performed to remove the sugars from the remaining grain particles and drained into a boiling vessel for additional processing. After the fermentable sugars have been formed, they are boiled to sterilize the wort, and hops are added to provide bitterness. After boiling, the wort must be quickly cooled to room temperature so that yeast may be added to begin the fermentation process and prevent bacterial contamination from long term exposure of wort to temperatures below about 140° F.

If the wort is mashed at a high temperature (between about 156° F. and about 162° F.), a wort will be created with more unfermentable sugars, resulting in a sweet finished beer. If the wort is mashed at a low temperature (between about 140° F. and about 152° F.), a wort will be created with few unfermentable sugars resulting in a dry finished beer. If the wort is mashed at a medium temperature (between about 152° F. and about 156° F.), a wort will be created with a mix of fermentable and unfermentable sugars resulting in a medium sweetness finished beer. If, after the mashing process, the grains are not heated to between about 164° F. and about 169° F., the starch converting enzymes will not be destroyed and the character of the wort will continue to change. It will also make the removal of the viscous wort from the spent grains more difficult. If the sparge water temperatures are exceeded (above about 175° F.), tannins may be leached out of the grains making the wort objectionably astringent. If the wort is not cooled to the correct temperature, yeast may be damaged, may create undesirable flavors, or encourage bacterial growth.

Similarly, as another example, people who brew their own beer or ferment their own wine can use a hydrometer to find out how much sugar is dissolved in the liquid. Brewers like to be able to take an original gravity reading to allow them to predict the potential alcohol percentage for the beer and then track the specific gravity for the duration of the brewing process to ensure that the gravity level remains consistent from one batch to the other. This can also be useful for knowing when to stop the fermentation process. Another important factor in the brewing process is the pH of the mash. Poor control of mash pH can often lead to undesirable flavors including astringency from excessive tannins. Beer brewed in the proper pH range will have a better overall flavor profile, be well rounded, and taste better. The pH is critical to proper enzymatic action during the mash. If the pH is not in the desired range, the sugar conversion in the mash will be affected along with the fermentability and flavor of the wort and beer.

It is well known in the art to install a thermometer into the boiling and mashing vessels to monitor these temperatures. However, this requires a threaded fitting to be installed on the vessel wall to receive the thermometer. Typically, a hole is drilled in the wall of the vessel and a coupling is welded into the hole. The thermometer can then be installed into this fitting. However, this fitting and welding are expensive and time consuming, particularly for a homemade beer-maker where access to this equipment and skill is limited. "Weldless" adapter kits are commonly available, but are prone to leaks and do not provide sufficient rigidity for a long life. A common design utilizes a pair of o-rings and a thin nut. The o-rings are sandwiched between the wall of the vessel and the nut is placed on the thermometer on the inside of the vessel. It is then tightened to compress the o-rings. However, it is difficult to keep fluids from leaking past the threaded fittings in areas where the o-rings cannot adequately seal.

From the above, it is clear that temperature, pH, and specific gravity monitoring and control is vital to developing a beer matching the brewer's desires. Since there are numerous temperature rests and wide temperature ranges for all the brewing sub processes, it is difficult for the brewer, particularly the novice, to remember and control them precisely and consistently throughout an entire hectic brewing session. Additionally, many current instruments are analog in nature and require notation and manual documentation of these measurements. A need exists for a sensor to be combined with a transceiver configured to communicate to a brewing monitoring and control system to record and trigger certain controls to maintain a desired brewing protocol.

Accordingly it is an object of this invention to overcome these obstacles through improved functionality and design. The enhanced bottle filler assembly has improved on these various drawbacks to ensure easier, safer, and more reliable use in the filling of bottles and other containers.

BRIEF SUMMARY OF THE INVENTION

In one aspect, this disclosure is related to a modular wireless brewing sensor comprising a processor housing. The processor housing can have a power source, a processing means, an antenna and a RF transmitter. Coupled to the processor housing can be a probe housing. The probe housing can comprise a probe, a fitting, a seal element, and a fitting fastener.

In another aspect, this disclosure is related to a wireless modular brewing sensor comprising a processor housing, comprising a power source configured to provide power through the sensor. The power source can be connected to a power source and a wireless antenna and a RF transmitter communicatively coupled to a processing means. The RF transmitter can be adapted to send signals through an antenna to an external control system. A light source can also be communicatively connected to the processing means. Coupled to a processor housing can be a probe housing. A probe housing can have a probe that is configured to transmit data related to the environmental conditions within a vessel or the environmental conditions of a liquid within a vessel. The probe housing can have a fitting that has a coupling end and an expanded end on which is positioned a fitting face. The entire expanded end portion can be positioned internally of a vessel and vessel wall. The fitting can further have a coupling end being smaller than the expanded end portion. The coupling end can be spaced from said expanded end portion. The expanded end portion can have a threaded portion configured to couple the probe housing to the vessel. A seal element can be positioned on the fitting and be positioned to be in contact with the fitting face of the expanded end portion. A seal element retainer can be positioned about a seal element and located proximate to a fitting face. A fitting fastener can be attached to the portion of said coupling end of the fitting positioned internally of the brewing vessel and the vessel wall. The fitting fastener can be tightened to align and sealing position a seal element in a sealing and contacting relationship with a fitting face and an expanded end portion, a seal element retainer and a vessel wall.

In another aspect, this disclosure is related to a system for brewing beer using a wireless modular sensor comprising at least one wireless modular brewing sensor comprising a probe, processing means, a light source, an antenna, and a RF transmitter. A wireless modular brewing sensor can be programmed to collect environmental data of a brewing vessel through at least one probe and transmit data to a server. A server comprising a central processing unit, a memory, a clock, and a server communication transceiver can receive wireless communication transceiver from the wireless modular brewing sensor. The memory can have environmental data stored therein from at least one wireless modular brewing sensor. A central processing unit can be programmed to transmit the environmental data to a computer device having a user interface. A display can provide a visual representation of the environmental data on the display of a computer device. The server can reference the environmental data to pre-determined data thresholds stored on the server. In response to the environmental data exceeding a pre-determined data threshold, the server can automatically initiate a program stored on the server.

BRIEF DESCRIPTION OF THE DRAWINGS

The features and advantages of this disclosure, and the manner of attaining them, will be more apparent and better understood by reference to the following descriptions of the disclosed system and process, taken in conjunction with the accompanying drawings, wherein.

DETAILED DESCRIPTION OF THE INVENTION

Figure 1:
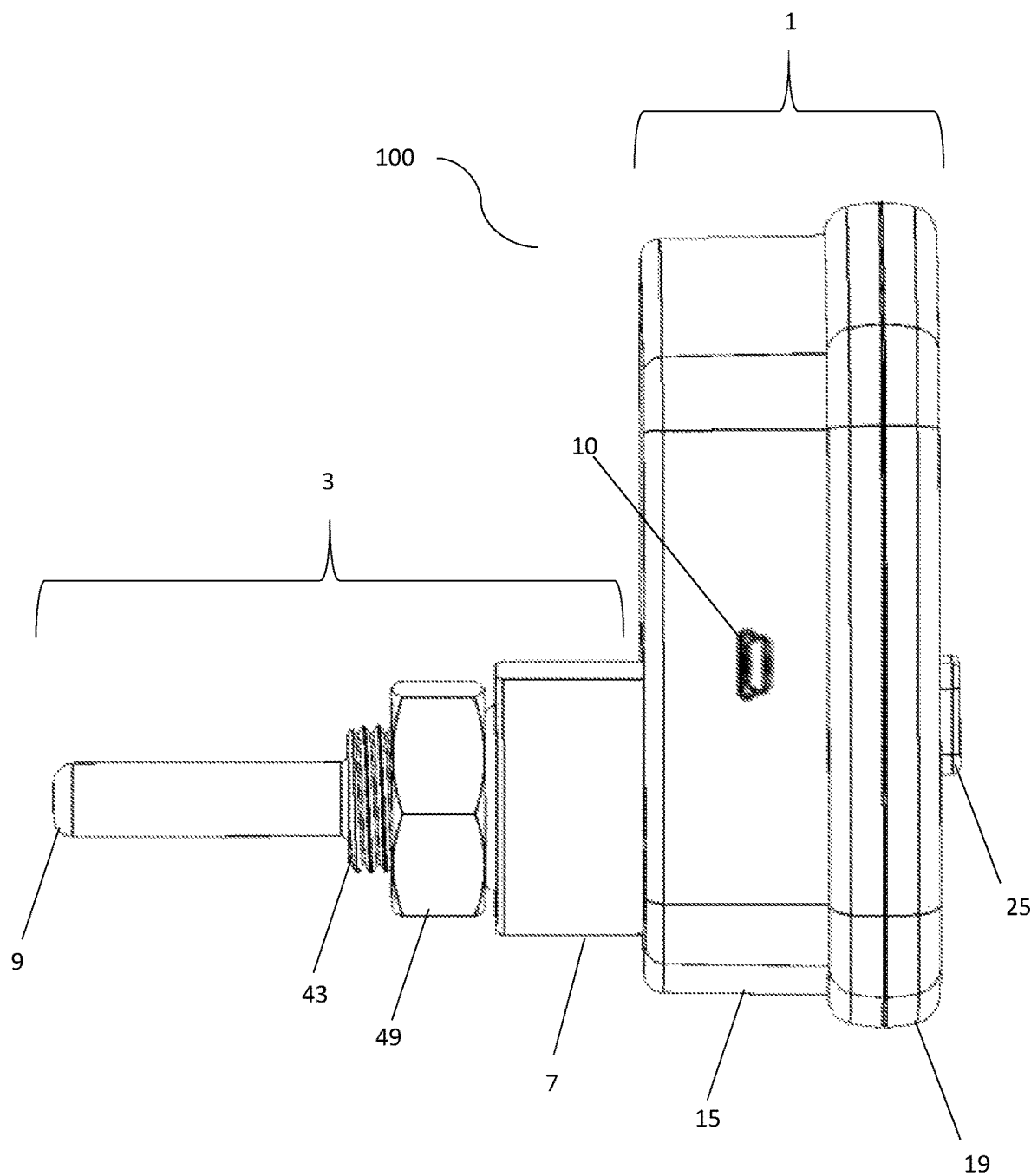
FIG. 1 is a side view an exemplary embodiment of a wireless modular brewing sensor.

Referring initially to FIG. 1, a wireless modular brewing sensor (WMBS) 100 can have a processor housing 1 and a probe housing 3. FIG. 1 illustrates the elements of the WMBS 100, where two housings can be coupled together by a number of means, including but not limited to a press fit coupling mechanism. Another embodiment can use a threaded coupling between the processor housing 1 and the probe housing 3. One exemplary embodiment can include a press fitting between the processor housing 1 and the probe housing 3 that can allow for the two housings to be decoupled from one another without the use of special tools. The ability to easily detach the two housings can allow a user to easily transport the processor housing 1 to different locations within an area and allow the processor housing 1 to be used with multiple types of probe housings 3.

Figure 2:
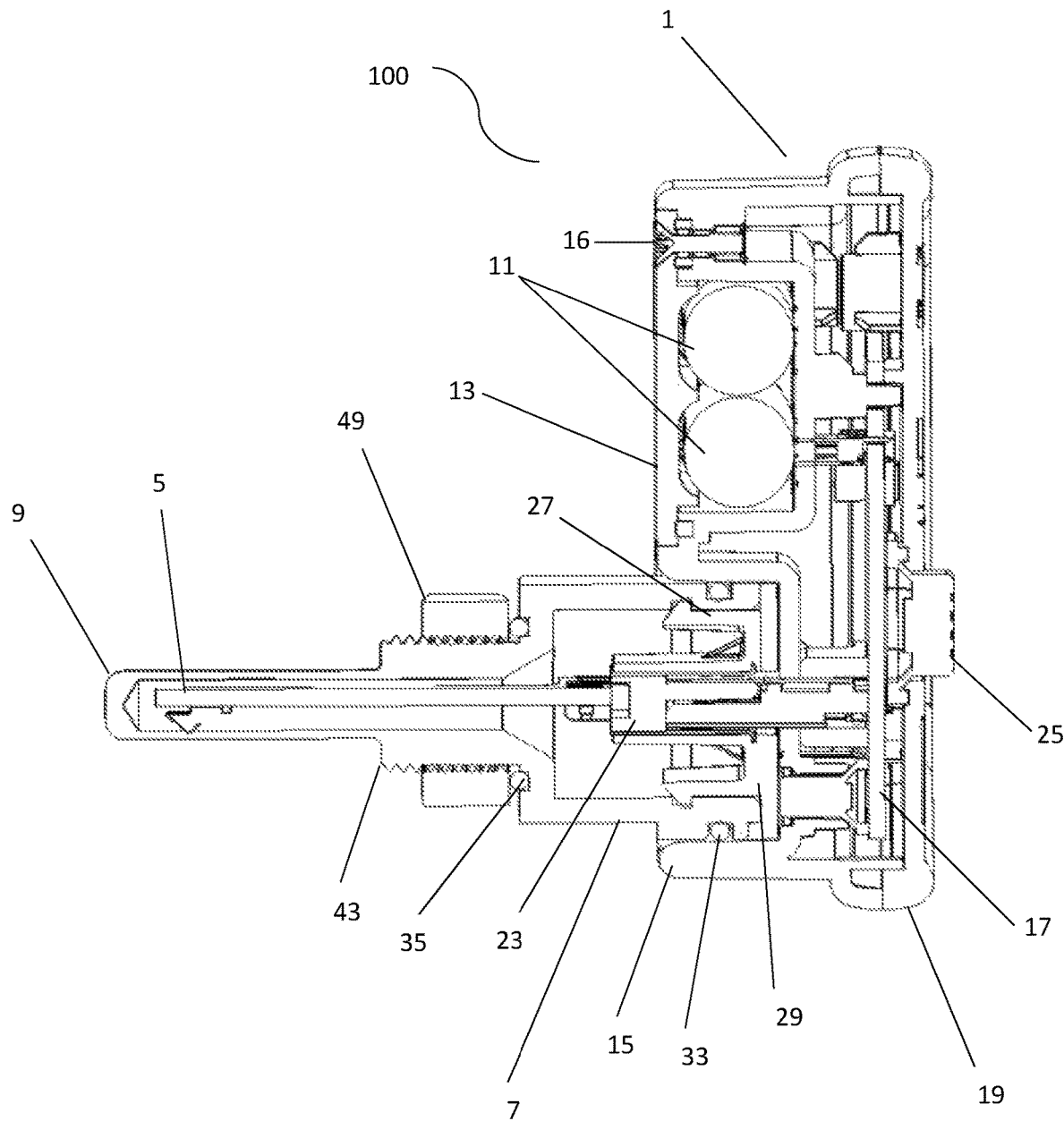
FIG. 2 is a cross-sectional side view of an exemplary embodiment of a wireless modular brewing sensor.
Figure 3:
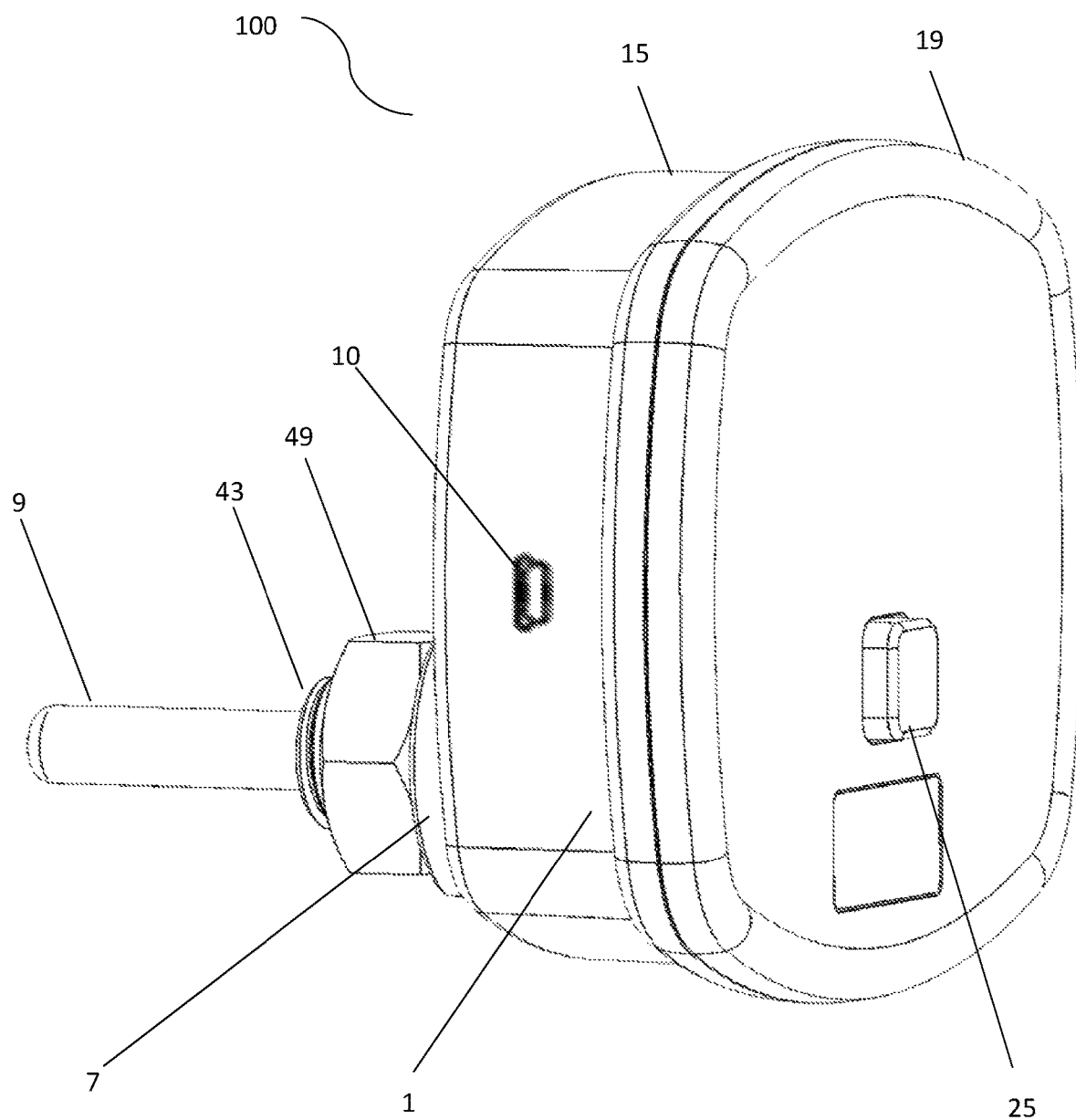
FIG. 3 is a perspective view of an exemplary embodiment of a wireless modular brewing sensor.
Figure 4:
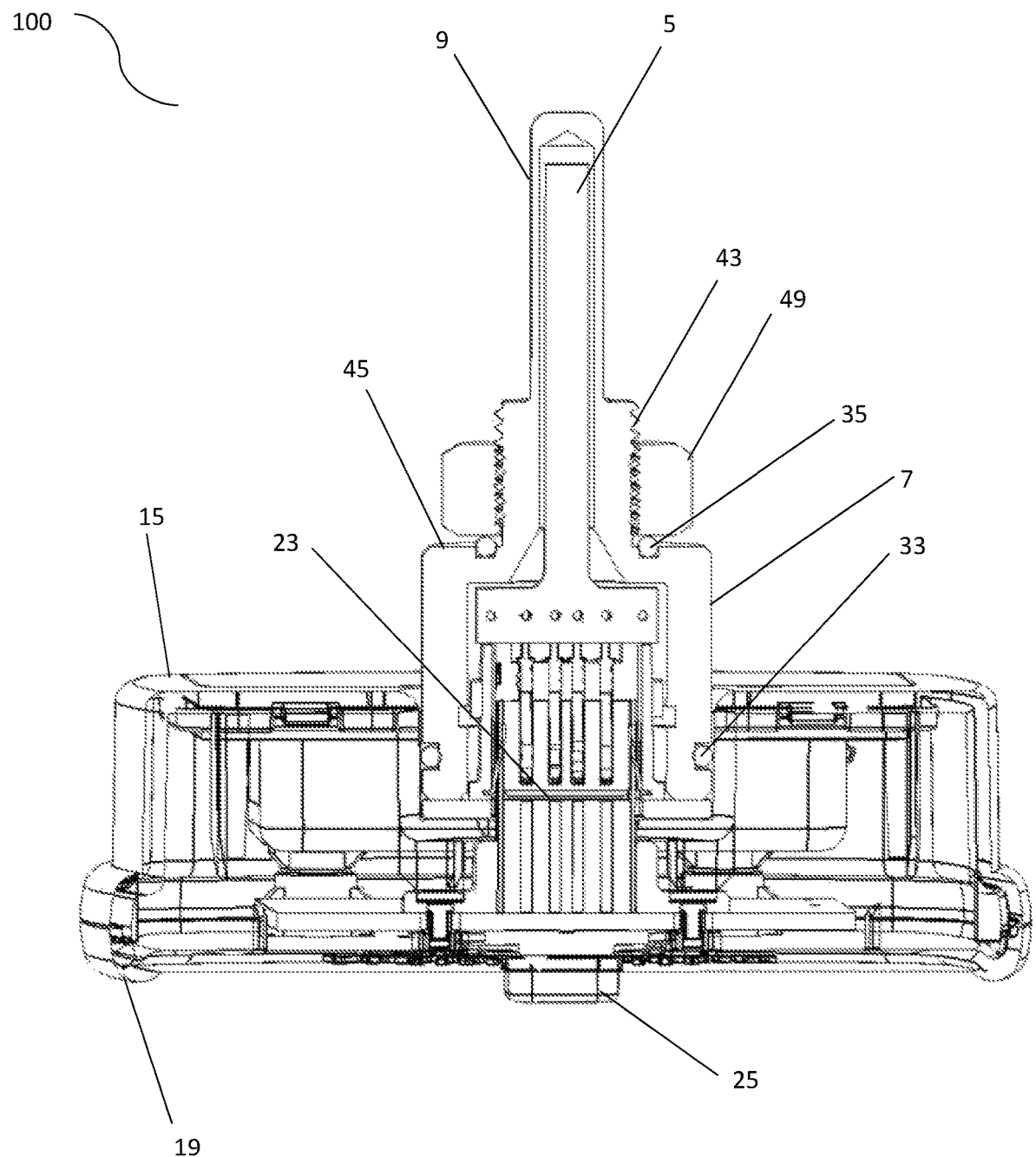
FIG. 4 is a cross-sectional bottom view of an exemplary embodiment of a wireless modular brewing sensor.

As shown in FIG. 2-FIG. 4, the probe housing 3 can accept a variety of probe 5 types and can be used for various applications. The modularity of the probes allows a user to have a single processor housing 1 that can use (a) separate probes of the same probe type or (b) the WMBS 100 with different types of probes, such as pH, specific gravity, and temperature. In one exemplary embodiment, a temperature probe can be used, wherein the probe housing 3 is put into thermal contact with a liquid. The probe housing can have an expanded end 9 and a coupling end 7 portion being spaced one from the other. The probe housing 3 can be constructed from a variety of materials, including but not limited to, metals or polymers. To allow for the multiple types of probes, the probe housing 3 can be configured to allow the probe to be exposed to the elements or provide a protective enclosure for a probe depending on the application and probe type.

A processor housing 1 can be constructed from any suitable material, including but not limited to a metal or a polymer. In a preferred embodiment, the processor housing 1 is optionally water resistant and shock resistant to protect the internal electrical components of the probe housing 3. Optionally, the processor housing 1 may comprise a power source 11. One exemplary power source 11 is a battery or multiple batteries, such as nickel-cadmium (NiCd), alkaline, lithium-ion, or lead acid batteries. The processor housing 1 can have a power source support structure 12 to maintain the power source 11 in its desired location. Similarly, the power source support structure 12 can be comprised of conductive material and be used to put the power source in electric communication with the processing means 17. Another embodiment may include a rechargeable power source 11, such as a lithium-ion battery. The processor housing 1 optionally comprises an accessory port 10 on the exterior of the processor housing 1 that is in electrical connection with the power source 11, allowing a user to plug-in a charger to power or charge the WMBS 100. Any suitable accessory port 10 can be used such as an AC port, mini USB, or USB. Another exemplary embodiment utilizes an inductive power standard to charge a rechargeable power source (e.g., Qi or PMA wireless charging). Similarly, a port can be used to provide direct power to the processor housing 1 from a remote power supply, such as a traditional AC plug-in. The WMBS 100 can be charged during operation or between uses. The WMBS 100 can have a removable back plate 13 to allow the user to access the power source 11 for removal, replacement, or maintenance of the power source. The back plate 13 can be coupled to the base 15 of the processor housing 1, and further include a back plate seal member 14 to aid in preventing moisture intrusion into the power source 11. The back plate 13 can be coupled to the base portion 15, using any suitable back plate coupling means 16, such as a back plate fastener or press fit.

Figure 6:
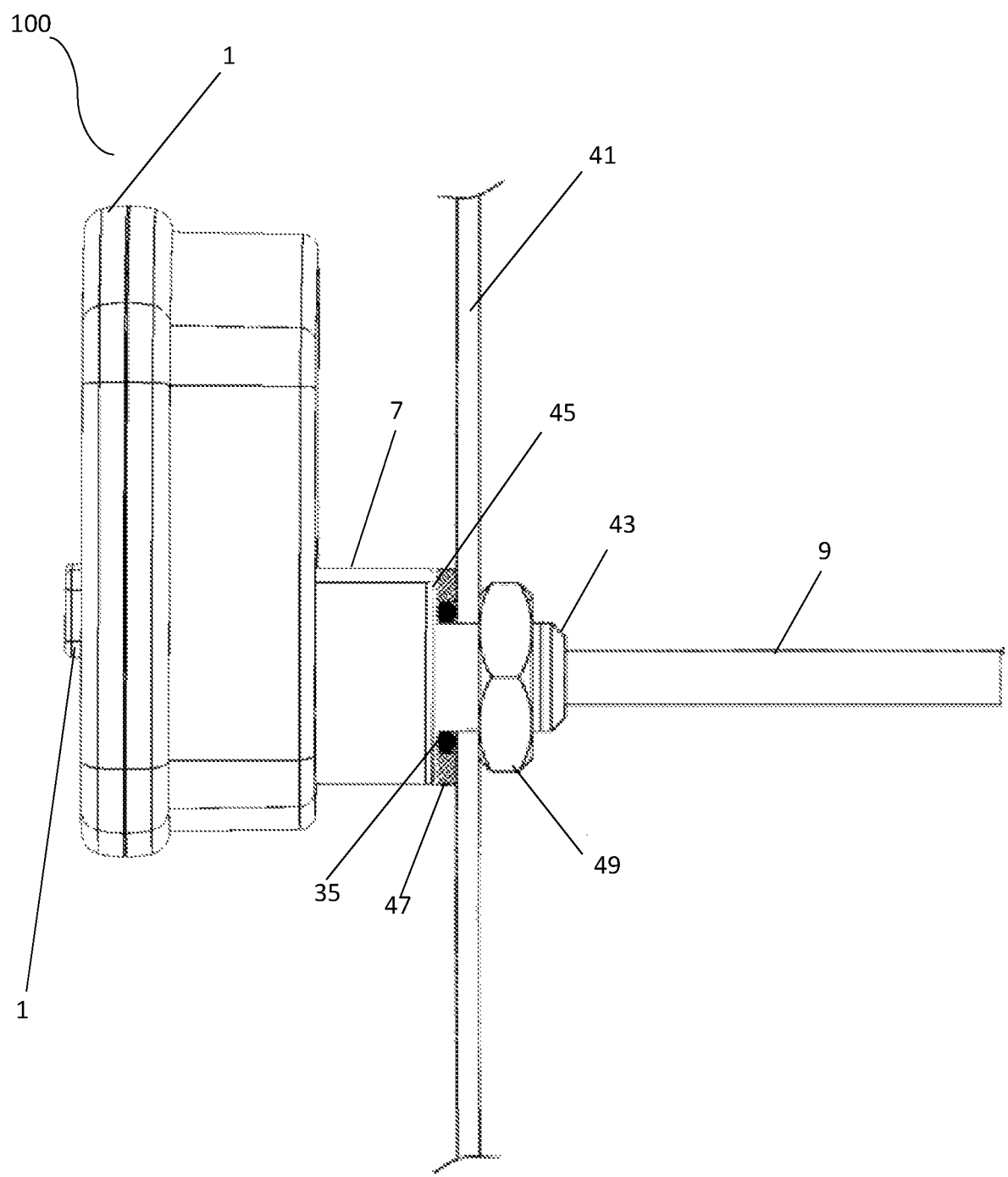
FIG. 6 is an exemplary embodiment of the present invention installed on a vessel.

As seen in FIG. 6, a processing means 17 can be housed inside the processor housing 1. The processing means is communicatively coupled to the power source 11. In some embodiments, the processing means 17 is a micro-controller or microprocessor. The processor housing 1 can have a cap portion 19 and a base portion 15. The cap portion can be removed to allow a user to easily access the interior of the processor housing and processing means for maintenance or replacement of components. The accessory port 10 can be communicatively coupled to the processing means 17 allowing a user to program or control the processing means. Similarly, the processing means 17 can also be communicatively coupled to a memory for storing data, which can be used to store information. The accessory port 10 can also be used to edit or remove data stored on the memory.

Figure 5:
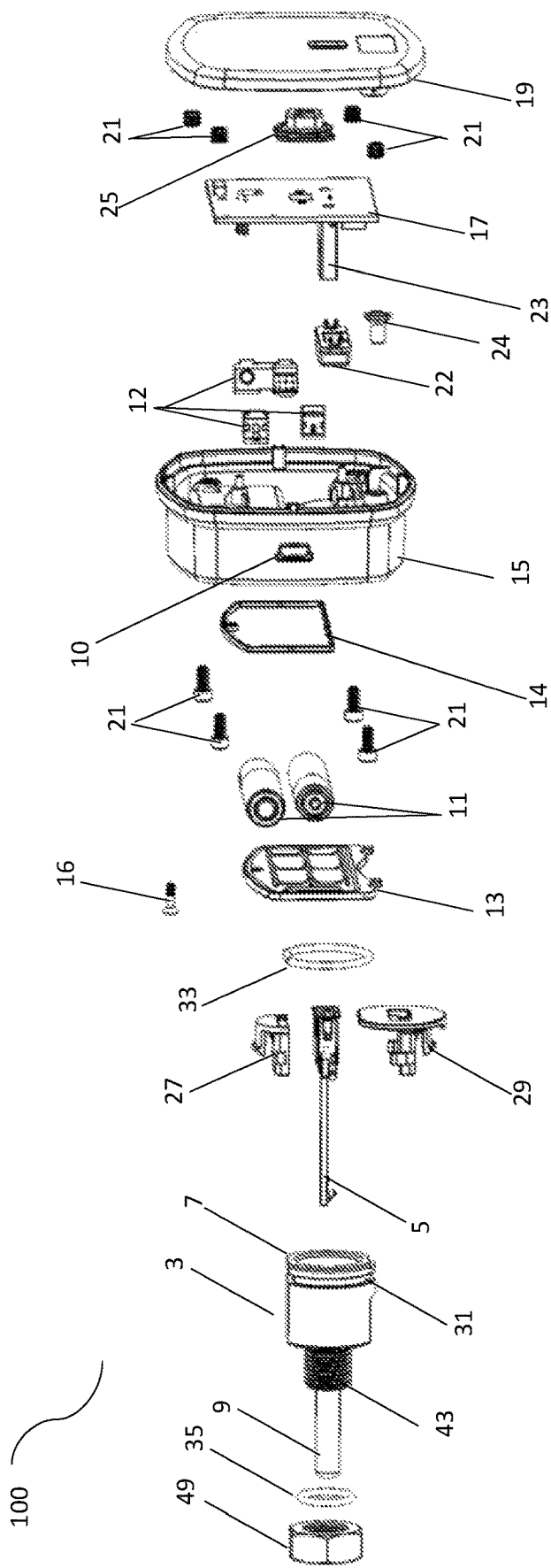
FIG. 5 is an exploded view of an exemplary embodiment of a wireless modular brewing sensor.

The cap portion 19 and base portion 15 of the processor housing 1 can be coupled together via any suitable coupling means 21, for example press fitting or by using fasteners as shown in FIG. 5. The base portion 15 and cap portion 19 can be configured to support the processing means 17 component internally within the processor housing 1. This internal support structure can prevent the processing means from resting on the walls of either the base portion 15 or cap portion 19 and further prevent exposure to heat. The processor housing 1 can also include a support member 22 that can provide support to a connection means 23 interfacing with the processing means 17, such as a USB connection.

The cap portion 19 may also have a light source 25 located externally and communicatively connected to the processing means 17. The light source 25 can become illuminated to signal a user when the WMBS 100 is on. In one exemplary embodiment the light source 25 can be a multi-color light emitting diode (LED) that can display a first color when the sensor is on, display a second color when the power source is low, and display a third color when a threshold is being exceeded. Optionally, the light source may be configured to flash during an event, such as those noted above.

The processing means 17 can comprise or be communicatively connected to one or more additional components through a plurality of data input terminals. Examples of such components include an antenna, transceivers, probes, lights, or combinations thereof. Said components may be integrated into single sensing package or individual components may operate in remote communication with each other. The probe 5 can be communicatively connected to a processing means 17 using any type of suitable connection means 23. The probe can be analog or digital in nature. If an analog probe is used, the processor housing can have and Analog-to-Digital (A/D) Converter that is communicatively connected between a processing means and a probe.

One exemplary embodiment can have a transceiver remotely located from and communicatively coupled (e.g. WiFi, USB cable connector) to the processor housing 1 and processing means 17, wherein the processing means 17 is communicatively coupled to a probe 5. The processor housing 17 can have an accessory port 10 to allow for remote components to be communicatively coupled to a processing means 17. Similarly, the processor housing 1 can include a transceiver and processing means. The processor housing 1 can be remotely located from the probe housing 3 and communicatively coupled to the probe housing 3 via a connection means 23 or any other suitable connection (e.g. WiFi).

Figure 7:
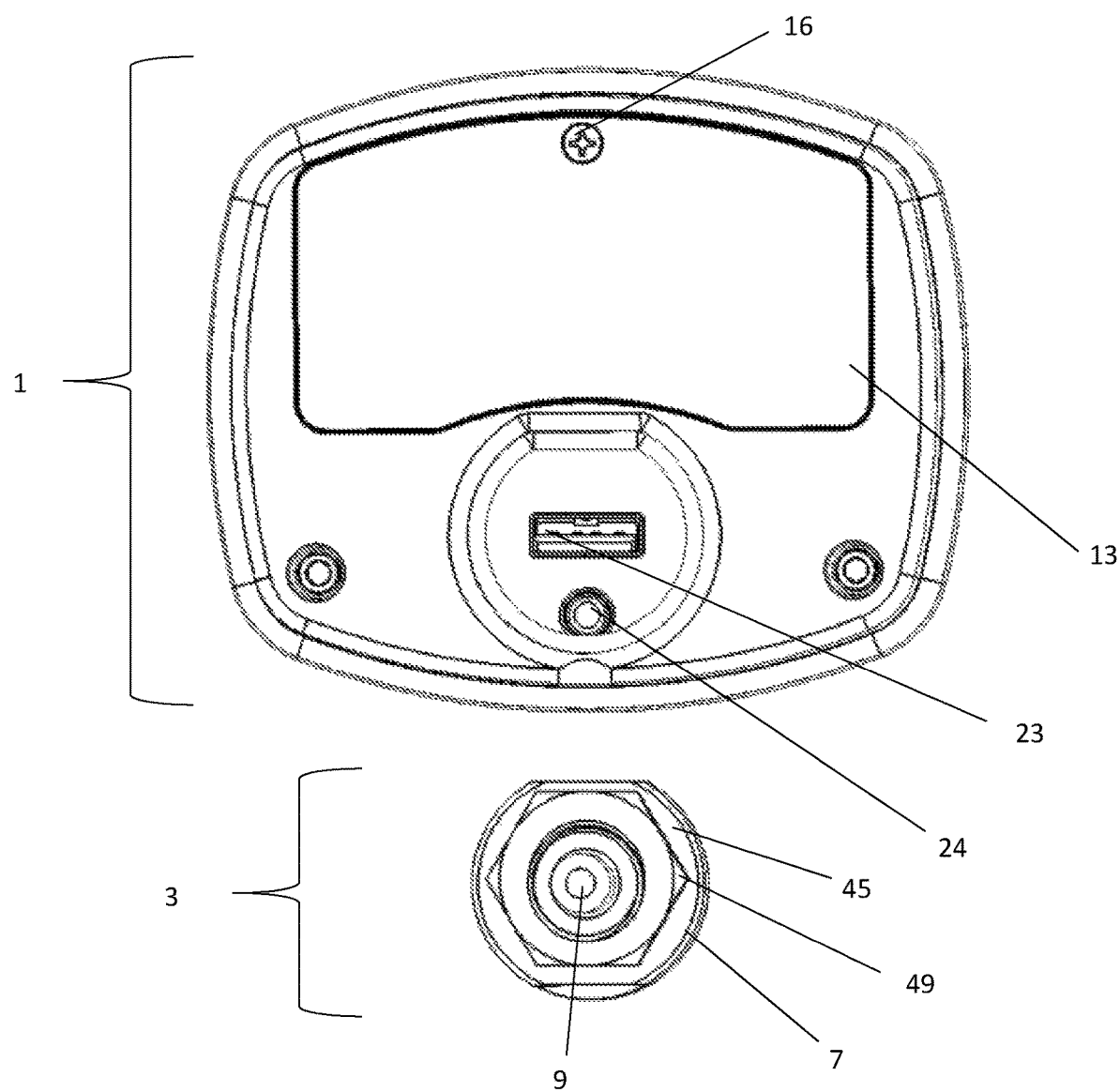
FIG. 7 is a rear view of an exemplary embodiment of the present invention with the probe housing separated from the processor housing.

Any type of suitable connection can be used with the WMBS 100 to connect a probe 5 to the processing means 1, such as any two wire connection. One exemplary embodiment may include a USB connection that allows for the probe 5 to be easily detached from the processing means 17. As previously mentioned the processing means can include an antenna that can be communicatively connected to an RF transceiver that is configured to receive output signals from the processing means 17. The RF transceiver can then send an output signal through an antenna to a control system or device that records or monitors the environmental conditions within the vessel as determined by a probe 5 in connection with the processing means. The transceiver and antenna can be located on a printed circuit board (PCB) along with the processing means. An RF transceiver can use Bluetooth, WiFi, or any other suitable wireless connection. A connection button 24 can be communicatively coupled to the processing means and used to "pair" or bring into communicative connection the WMBS with another WMBS or controlling means such as a server or mobile device. The connection button 24 can be located near the connection means where the probe housing 3 and processor housing 1 are coupled together, as shown in FIG. 7. In an alternative embodiment, the light source can be incorporated into a button on the cap portion and be used as a connection button for "pairing" the WMBS as well as other elementary functions of the WMBS, such as turning on or off.

As shown in FIG. 5, the probe housing 3 can use a probe support member for securing the probe within the probe housing. A probe support member can include two parts, an upper support 27 and a lower support 29. The probe housing 3 can also have a groove 31 configured to accept a coupling seal 33 or other suitable seal element located near the expanded end 9 of the probe housing 3. The coupling seal 33 can act as a gasket when the probe housing and the processor housing are coupled together. The coupling seal 33 can form a seal and prevent unwanted moisture from entering the processor housing unit or cause possible interference with the probe connection to the processing means. Similarly, the o-ring can act somewhat as a friction element to aid in maintaining the probe housing 3 coupling to the processor housing 1 in a press fit design. The ability to separate the probe housing 3 from the processor housing 1 also allows the user to clean the probe 5 adequately to help prevent any contamination that may arise from improperly cleaned instruments that are used in the brewing process. Sanitation of brewing equipment is critical and by allowing a user to adequately clean the probe without running the risk of submerging or exposing the processor housing portion of the WMBS 100 to harmful chemicals can prevent the occurrence of inaccurate readings by the WMBS 100.

Another advantage of the detachability of the probe housing 3 from the processor housing 1 is to protect the processor housing from excessive heat. In the instance where a temperature probe is being used, a high temperature threshold can be set with the control system, such as an app on a mobile device, which is communicatively coupled to the WMBS 100. The control system could then trigger an alert or alarm via the light source 25 or audible alarm to the user that the threshold is being approached or has been surpassed, allowing a user to quickly remove the processor housing 1 from the excessive heat as well as change the control setting to lower the heat.

The processing means can be programed to conduct various functions. The processing means can transmit the environmental data to an electronic device, for example a laptop, tablet, or smartphone that has a user interface. Through the display and the user interface, a visual representation of the environmental data can be displayed to allow the user to monitor the environmental conditions within the brewing vessel, such as the temperature of the liquid in a vessel, the specific gravity, the level of a liquid within the vessel, or the pH, among others.

The user can establish predetermined thresholds in the system, wherein an alarm is triggered upon the environmental conditions exceeding these predetermined thresholds. Furthermore, a user can set predetermined programs depending on the type of beer they are brewing, wherein the program uses a timer or other triggers (e.g., achieving a predetermined pH level) to establish a new pre-determined threshold or brewing stage. These programs can consist of multiple predetermined thresholds for a predetermined amount of time. The electronic device can display these programs and each step through a graphical user interface and display.

As shown in FIG. 6, the WMBS 100 can be installed in a brewing vessel and vessel wall 41. The vessel wall 41 can form an enclosure within the brewing vessel. The vessel wall 41 can have a hole for receiving a probe housing. The expanded end 9 can have a threaded portion 43 to allow the probe housing 3 to be coupled to a threaded or non-threaded hole in the vessel. The expanded end 9 can be positioned partially within or entirely internal relative to the brewing vessel or vessel wall 41. The expanded end 9 can be smaller than the coupling end 7 portion, which may be coupled to the processor housing. The coupling end 7 portion can be positioned within or external to the brewing vessel and vessel wall. A second o-ring 35 can be utilized proximate to the threaded portion 43 of the expanded end 9 of the probe housing to provide a pressure tight seal between the vessel wall 41 and a fitting face 45 that can be positioned on a coupling end 7 portion.

A fitting face 45 can separate the expanded end 9 from the coupling end 7 portion. A seal element retainer can be used to properly locate the seal element. In one exemplary embodiment, the fitting face can have an integral o-ring groove 31 and the seal member can be an o-ring 35 that is located within the o-ring groove 31. Other embodiments may use a sealing ring or a simple flat gasket to form a sealing relationship. That is, in alternative embodiments, the seal element retainer 47 may be a washer configured to retain a seal element, which may be, e.g., an o-ring, a flat rubber washer, or a flat plastic washer as shown in FIG. 6. A fitting fastener 49 can be coupled to the threaded portion 43 of the expanded end 9 of the probe housing 3 and tightened, compressing an o-ring 35 between the vessel wall 41 and fitting face 45 near the coupling end 7 portion. Similarly a seal element 35 such as an o-ring can be sealingly positioned in sealing and contacting relationship with each of the fitting faces 45 of the coupling end 7 portion, the seal element retainer 47, and the vessel wall 41 thereby creating a tight and reliable seal.

At least a portion of the probe housing 3 can be positioned internal relative to the vessel wall 41 of the brewing vessel. The processor housing 1 can be positioned external relative to the vessel wall of the brewing vessel. At least a portion of the expanded end 9 is positioned internally of the vessel wall. A nut can be threadingly attached to the portion of the expanded end 9 positioned internal relative to a vessel wall 41 of the brewing vessel, aligning and sealingly positioning the seal element 35 in sealing and contacting relationship with each of a fitting face of the coupling end 7, the seal element retainer 47, and the vessel wall 41.

Some additional advantages associated with the WMBS is the ability for a wireless connection with the control system that is designed to prevent loose or dangling wire around a vessel that can be exposed to high temperatures or physically interfere with the brewing process. The modularity of the WMBS also provides a benefit by allowing the user to replace a part of the sensor instead of the whole sensor. A WMBS can also be wired to a control system that is remotely mounted.

In another aspect of the present invention, a control system 201 could automate a brewing system upon reaching a threshold and control a burner's temperature to reduce the heat being applied to a vessel. In one embodiment the probe can be a thermometer probe used to measure the temperature of the liquid in the vessel. The WMBS can send a signal to the control system monitors real-time temperature fluctuations. The control system can then record and track the temperature variances within the vessel. Other embodiments could use a pH probe or a hydrometer for measuring specific gravity, or use a combination of all probes in a WMBS.

Figure 8A:
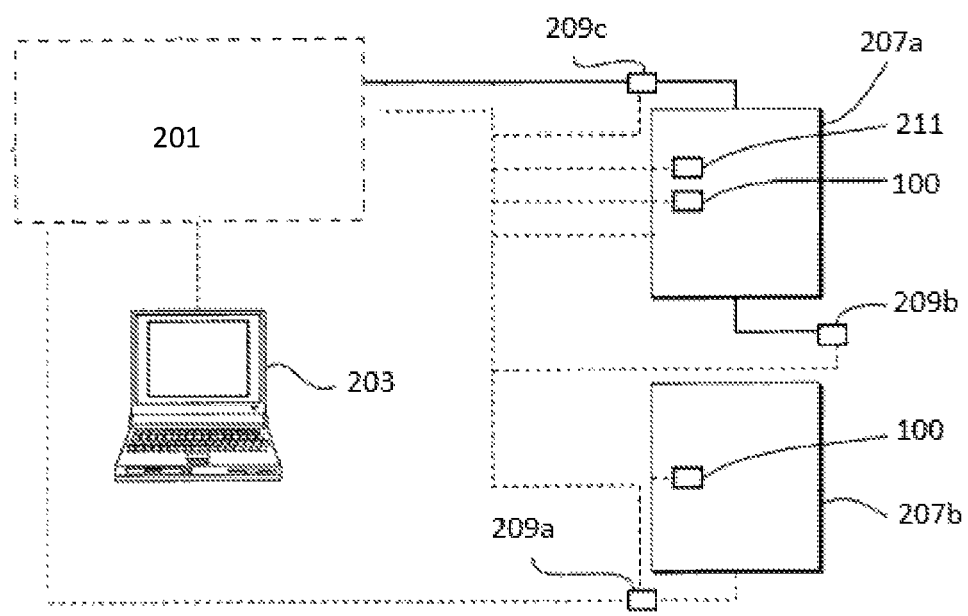
FIG. 8A illustrates an exemplary embodiment of a brewing system using a wireless modular brewing sensor.

In one example illustrated in FIG. 8A, a user could establish a brewing system comprising multiple brewing vessels 207a, 207b or fermenters that each have their own WMBS 100. When the mash or liquid is transferred from one vessel to another, the processor housing could be decoupled from the first probe and coupled to a second probe located in a second vessel. This allows for a more economical approach to home brewing by not requiring a user to purchase the higher cost processor housing and obtain a broader array of sensors that can be used with the processor housing at a lower cost than multiple complete units would cost.

A control system 201 can be communicatively connected to the WMBS 100. A user can establish certain thresholds and programs using the control system 201 and the WMBS 100 can be used to monitor the parameters established in the control system. One exemplary embodiment can use a wireless connection between the control system 201 and a WMBS 100. A control system 100 can trigger an actuator, valve, pump, or other system element 209a, 209b, 209c. It could also manipulate a burner, chiller, or other component 211a of an automated brewing system. For example the control system 201, could either turn a burner on or off, or could increase or reduce the heat applied to a vessel 207. Similarly, a valve could be manipulated and optionally used in conjunction with a pump to move the liquid from one vessel to another vessel, or in some instances recirculate the liquid within the same vessel.

Figure 8B:
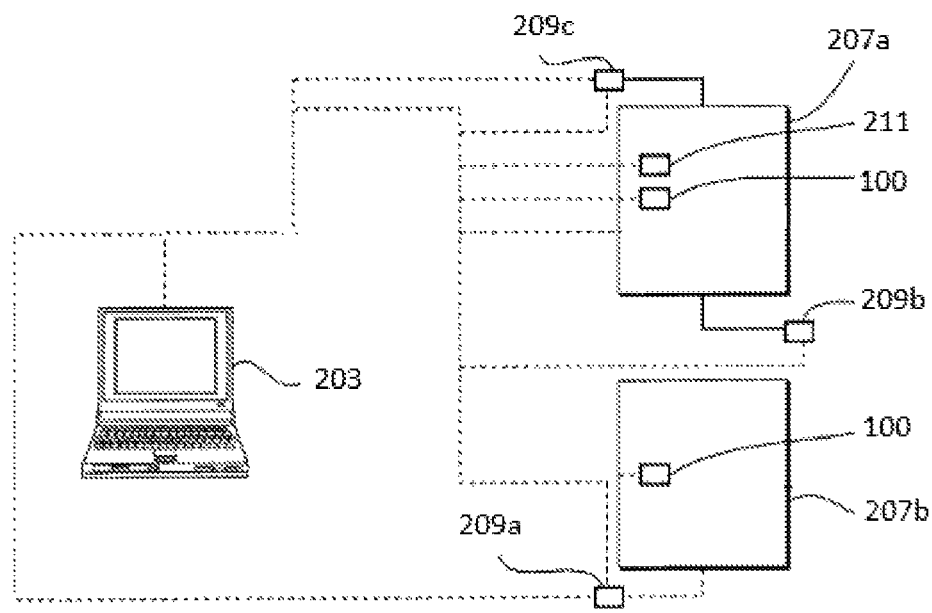
FIG. 8B illustrates an exemplary embodiment of a brewing system using a wireless modular brewing sensor.

Additionally, multiple WMBS can be used in connection with each other. This can allow a user to set up a holistic automated brewing system allowing each WMBS to send a signal to the control system 201. The control system can further have a user interface 203 to allow the user to monitor the multiple WMBSs simultaneously. In one embodiment, the control system 201 can be controlled using an app suitable for use on the user's personal device 203, such as a smartphone, computer or tablet device, enabling control of the WMBS 100 settings and brewing system. The WMBS 100 can have thresholds determined through the control system that will trigger a signal to the user when these thresholds have been exceeded. In one exemplary embodiment, shown in FIG. 8B the user interface 203 and control system 201 can be in a single device and can control individual system elements 209 and WMBS 100. In this embodiment, the individual system elements 209 can have built in wireless transceiver along with an actuator to actuate the system element 209 via the user device/interface 203 capable of controlling the individual system elements 209, wherein the device 203 can comprise a central processing unit, a memory, a clock, and a server communication transceiver that sends and receives wireless communication with a WMBS 100, as well as system elements 209.

Figure 8C:
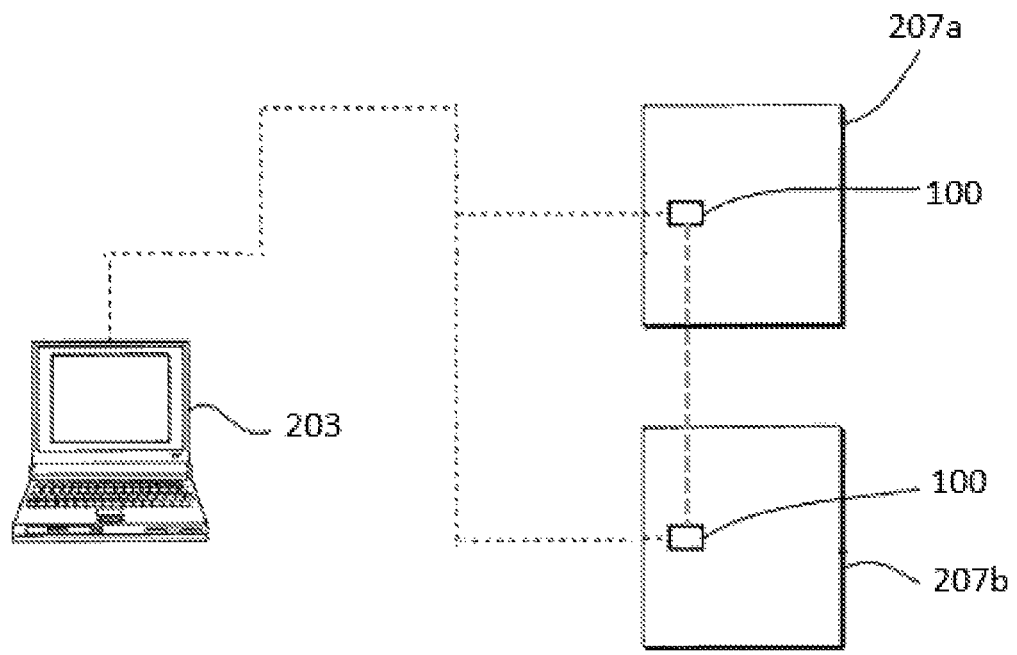
FIG. 8C illustrates an exemplary embodiment of a brewing system using a wireless modular brewing sensor.

Another aspect of the invention, shown in FIG. 8C, is a system for brewing beer using a WMBS 100 that enables the user in coordination with a WMBS to monitor the various steps of the brewing process and environment of the brewing vessel(s) 207a,b, such as the temperature, pH, and specific gravity variables associated with brewing beer. An exemplary embodiment of the system can have at least one wireless modular brewing sensor 100 that comprises a probe, a processing means, a light source, and a transmitter (e.g., an RF transmitter). The WMBS 100 can be programmed by a user device 203 to collect environmental data from the brewing vessel through the probe. The device 203 capable of controlling the control system can comprise a central processing unit, a memory, a clock, and a server communication transceiver that sends and receives wireless communication with a WMBS 100. This device can be any suitable device 203, such as a tablet, computer, mobile phone, or other device. The memory of the device 203 can store environmental data that is received from the WMBS 100.

Additionally, multiple WMBS 100 can communicated with each other as well as the device 203. FIG. 8C illustrates the brewing system being used with two vessels, but any number of vessels can be used, with each vessel using a WMBS 100 sensor. This system is ideal for monitoring various vessel environments, such as temperature, pH, liquid level, specific gravity, among other within a single or multiple vessels. Each WMBS can be programmed to run a specific program containing desired environmental parameters, or additionally programmed to trigger an alarm or an alert after an environmental parameter is maintained for a specified duration.

Additional equipment can be communicatively coupled to the server and the electronic device to trigger automation of brewery equipment, such as burners and pumps. For example, upon reaching or exceeding a predetermined threshold, the electronic device can transmit a signal to a controller that is communicatively connected to the burner to apply more or less heat according to the program set by the electronic device and transmitted to the server. This system can further be applied to the multiple steps of the brewing process to trigger heat adjustments to the burners depending on the program, then transmit a signal to the controller that is communicatively connected to a pump. The pump then moves the liquid in a first vessel to a second vessel, or recirculates the contents of a single vessel.

While some embodiments of the invention have been illustrated above, it is to be understood that the invention is not limited to details of the illustrated embodiments, but may be embodied with various changes, modifications or improvements, which may occur to those skilled in the art, without departing from the scope of the invention.

LIST OF ELEMENTS

1 Processor Housing
2
3 Probe Housing
4
5 Probe
6
7 coupling end
8
9 expanded end
10 accessory port
11 power source
12 power source support structure
13 back plate
14 back plate seal member
15 base portion
16 back plate coupling means
17 processing means
18
19 cap portion
20
21 coupling means
22 support member
23 connection means
24 connection button
25 light source
26
27 probe upper support
28
29 probe lower support
30
31 groove
32
33 coupling seal
34
35 seal element
36
37
38
39
40
41 vessel wall
42
43 threaded portion
44
45 fitting face
46
47 seal element retainer
48
49 fitting fastener 100 Wireless Modular Brewing Sensor
201 control system
203 user interface
207 vessel
209 system element
211 secondary system component

What is claimed is:

1. A wireless modular brewing sensor comprising:
a processor housing, comprising:
 a power source in communication with the sensor; a microprocessor connected to the power source; a transceiver;
 a wireless antenna communicatively coupled to the microprocessor, adapted to send signals to an external control or monitoring system; and
 a removable back plate to access the power source, wherein the back plate further comprises a back plate seal member configure to prevent moisture intrusion into the power source; and
a probe housing, comprising:
 a probe, wherein said probe is selected from a group comprising: a temperature probe, hydrometer probe, pH probe, flow probe configured to transmit data related to the environmental conditions within a vessel; and
 a fitting having an expanded end portion on which is positioned a fitting face, the entire expanded end portion being positioned internal of a vessel and a vessel wall, said fitting further having a coupling end being larger in diameter than said expanded end portion and being spaced from said expanded end portion, at least a portion of said coupling end being positioned external of said brewing vessel and said vessel wall;
wherein said processor housing is couplable with said probe housing utilizing a press fit coupling mechanism wherein said coupling end further having a coupling seal configured to inhibit moisture from entering the processor housing and maintaining a coupling relationship between the processor housing and probe housing.

2. The wireless modular brewing sensor of claim 1, wherein the probe housing further includes:
 a seal element being positioned on said fitting, said seal element being positioned in contacting relationship with said fitting face of said expanded end portion; and
 a seal element retainer being positioned about said seal element and in direct contacting relationship with said fitting face.

3. The wireless modular brewing sensor of claim 2 wherein said seal element is a ring seal.

4. The wireless modular brewing sensor of claim 2 wherein the probe housing further comprises a fitting fastener attached to the portion of the coupling end of the fitting positioned internal of the brewing vessel and the vessel wall wherein tightening of the fastener aligns and sealingly positions the seal element in sealing and contacting relationship with each of said fitting face of said expanded end portion, said seal element retainer, and said vessel wall.

5. The wireless modular brewing sensor of claim 1, wherein said probe is supported within the probe housing by a support member having two parts including an upper portion and a lower portion, wherein the probe is communicatively connected to the microprocessor.

6. The wireless modular brewing sensor of claim 1, further comprising a light source communicatively connected to the microprocessor, configured to provide visual indication of a predetermined condition.

7. The wireless modular brewing sensor of claim 1, wherein the power source comprises a battery.

8. The wireless modular brewing sensor of claim 1, wherein said temperature probe is configured to contact the fluid or gas in a vessel, generate a signal according to the temperature of the fluid or gas, and transmit the temperature reading determined by said probe to a control system.

9. The wireless modular brewing sensor of claim 1 wherein said hydrometer probe is configured to measure specific gravity.

10. The wireless modular brewing sensor of claim 1 wherein a portion of said expanded end portion is threaded.

* * * * *